United States Patent [19]

Bennett et al.

[11] Patent Number: 4,998,249
[45] Date of Patent: Mar. 5, 1991

[54] METHOD AND SYSTEM FOR MULTIPLEXING TELEPHONE LINE CIRCUITS TO HIGHWAY LINES

[75] Inventors: Robert B. Bennett, Fountain Hills; Robert J. Hager, Scottsdale, both of Ariz.

[73] Assignee: Executone Information Systems, Inc., Scottsdale, Ariz.

[21] Appl. No.: 264,268

[22] Filed: Oct. 28, 1988

[51] Int. Cl.$^5$ .............................................. H04J 3/04
[52] U.S. Cl. .................................. 370/112; 370/95.1; 370/67
[58] Field of Search ....................... 370/85.1, 58.1, 66, 370/67, 112, 95.1

[56] References Cited

U.S. PATENT DOCUMENTS

| | | | |
|---|---|---|---|
| 3,959,596 | 5/1976 | Bojanek et al. | 370/67 |
| 4,477,900 | 10/1984 | Gruenberg | 370/112 |
| 4,530,093 | 7/1985 | Akram et al. | 370/85.1 |
| 4,672,604 | 6/1987 | Bhatia et al. | 370/67 |
| 4,672,662 | 6/1987 | Nishino et al. | 370/58.1 |

OTHER PUBLICATIONS

Motorola, Inc., Telecommunications Device Data, DL 136, Rev. 1, Addressable Time Slot Assigner Circuit (TSAC) MC 14416, pp. 2-149 through 2-172.

Primary Examiner—Douglas W. Olms
Assistant Examiner—Wellington Chin
Attorney, Agent, or Firm—Ratner & Prestia

[57] ABSTRACT

A method for multiplexing data between a set of line circuits and a set of time division multiplexed highway lines connected to a central switch. Line circuits are organized into clusters of fixed numbers of circuits. Groups of four clusters send data to and receive data from a single multiplexer/demultiplexer. One or more multiplexers may be connected to the same set of highways. A single master processor performs all of the highway and time slot assignments for the network. These assignments are made so that each cluster will transmit or receive during consecutive time slots on a single highway line. The multiplexer is capable of providing conductivity between any cluster and any of the highways. The highway and time slot assignments for each cluster may be altered by reprogramming the multiplexer.

7 Claims, 9 Drawing Sheets

PHYSICAL CONNECTIVITY FOR CLUSTERS-OF-4 MULTIPLEXING SYSTEM

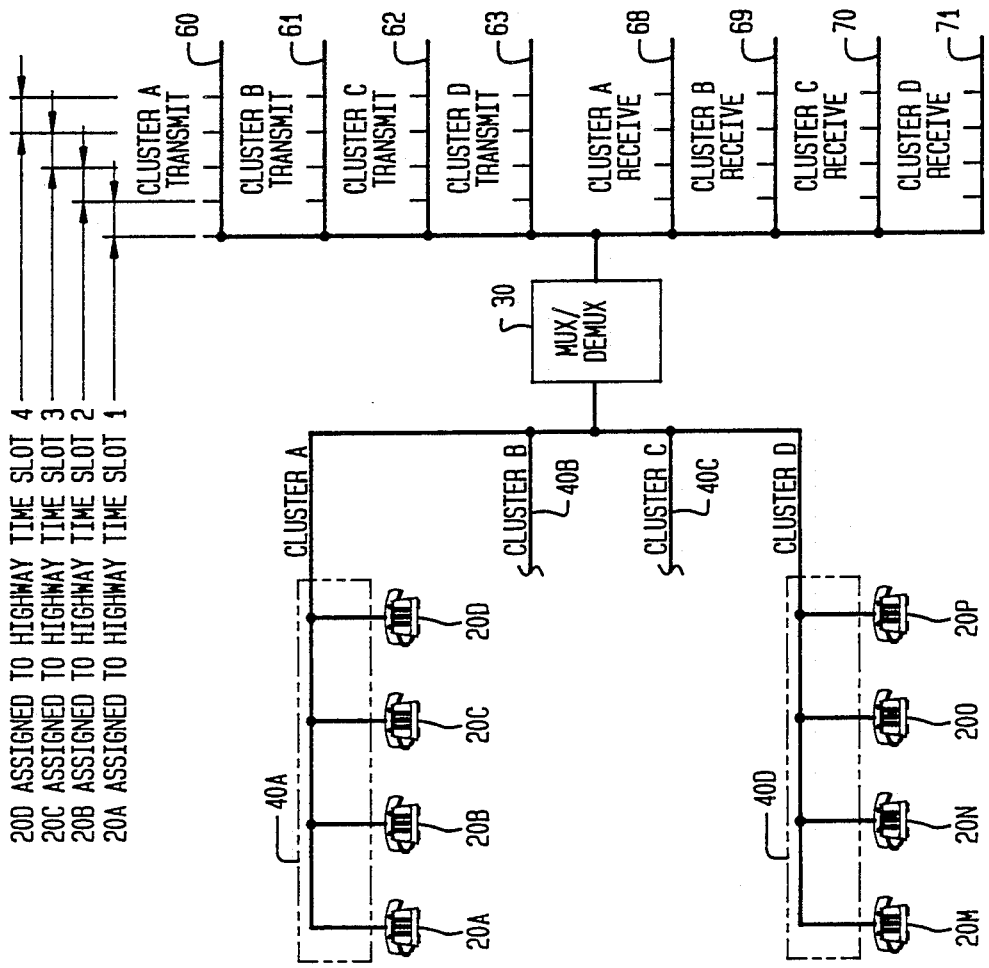

PERIPHERAL PROCESSOR

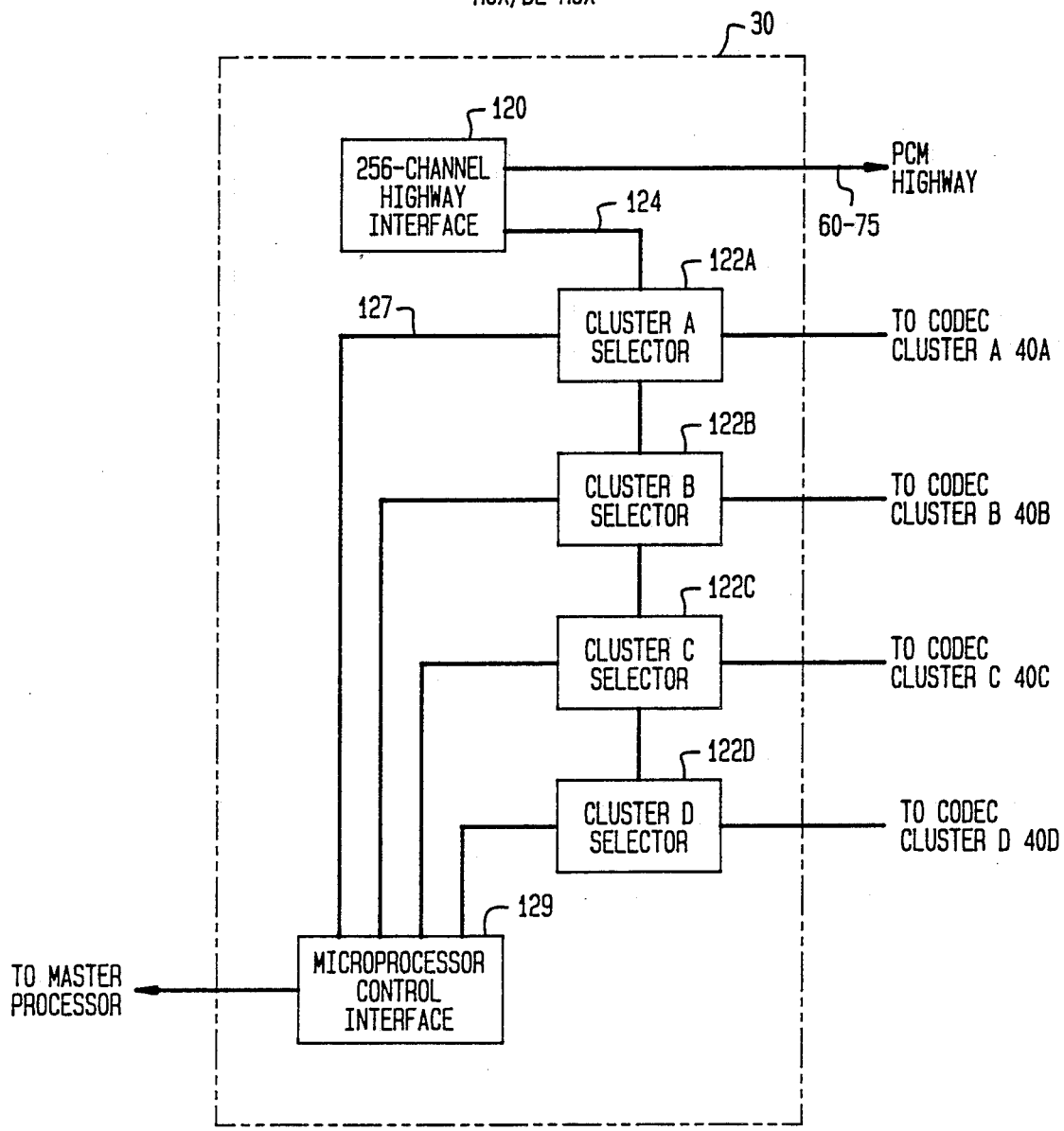

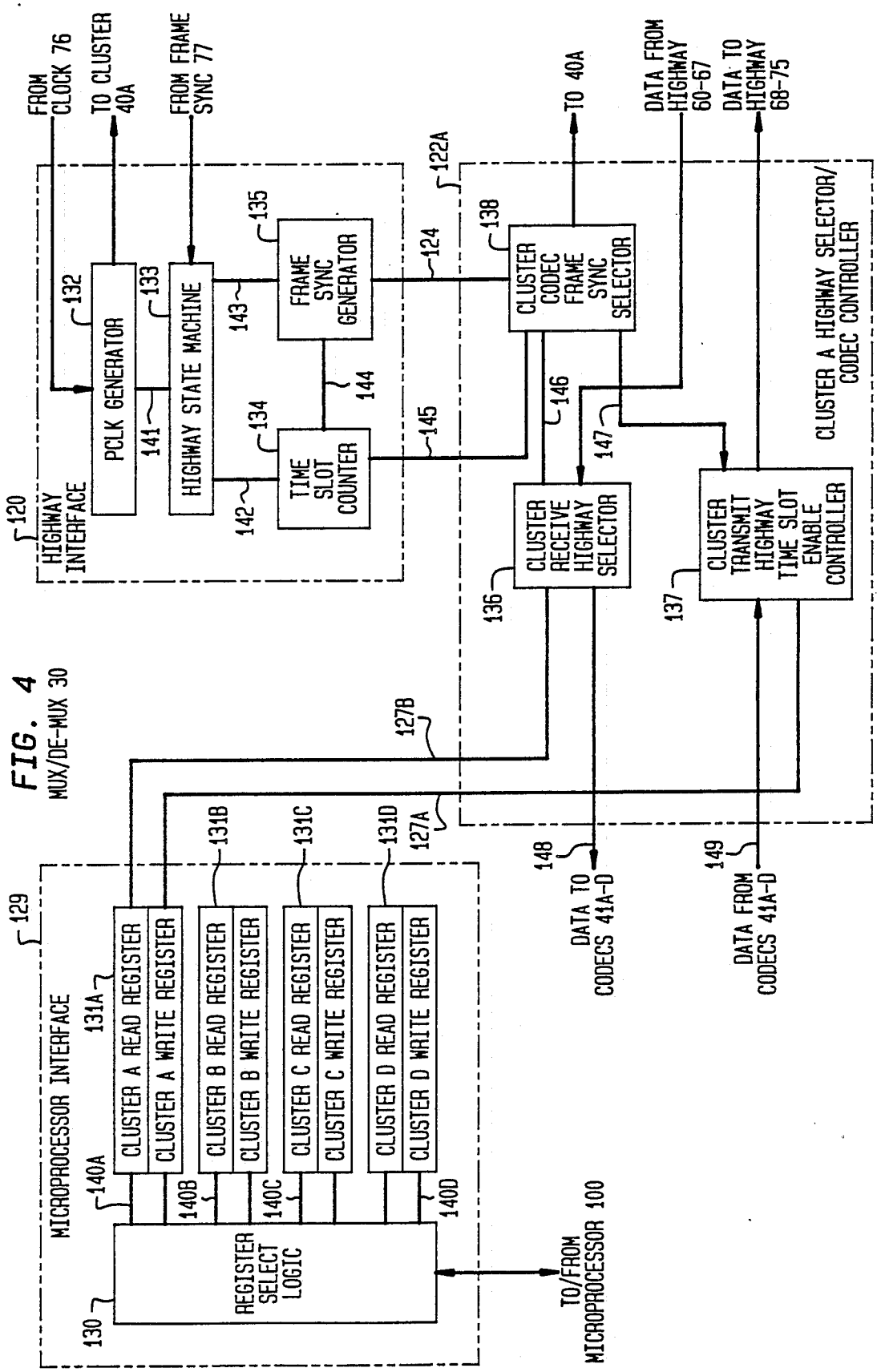
FIG. 4 MUX/DE-MUX 30

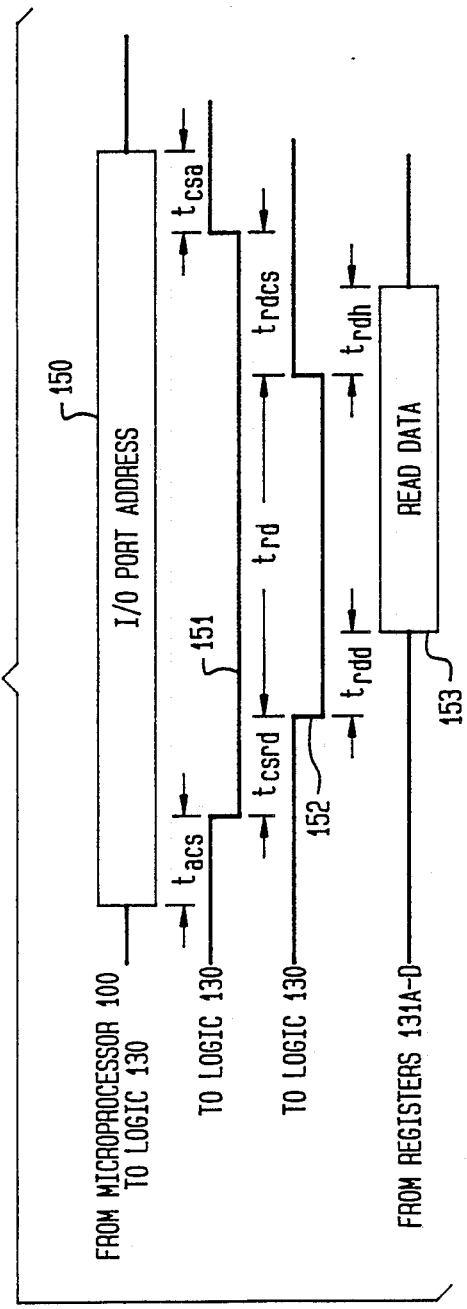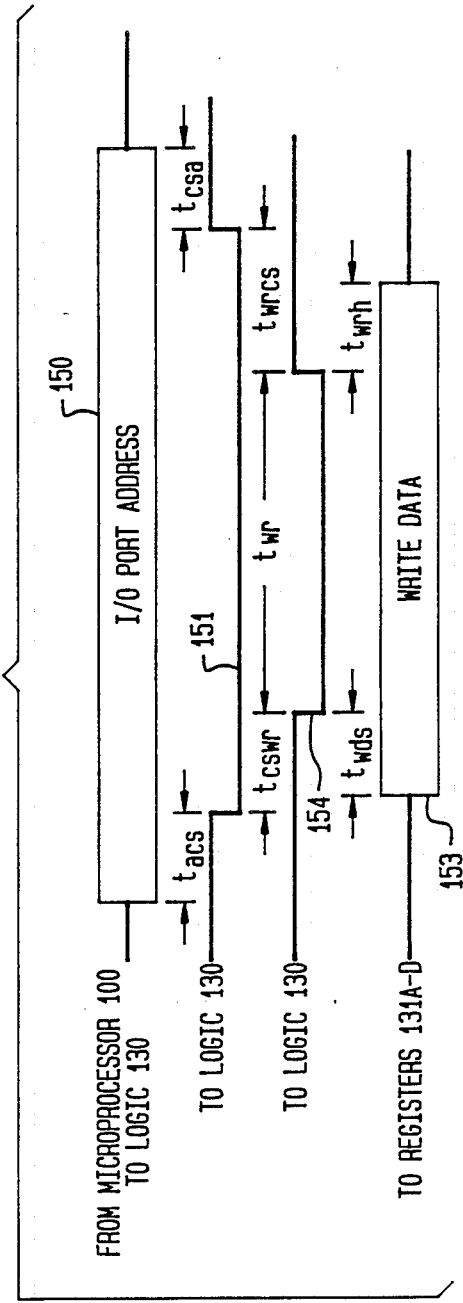

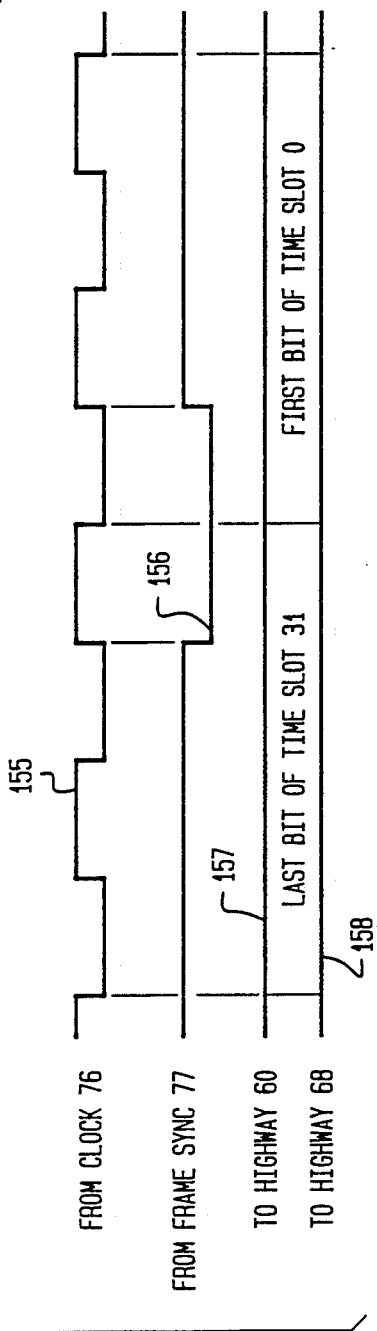
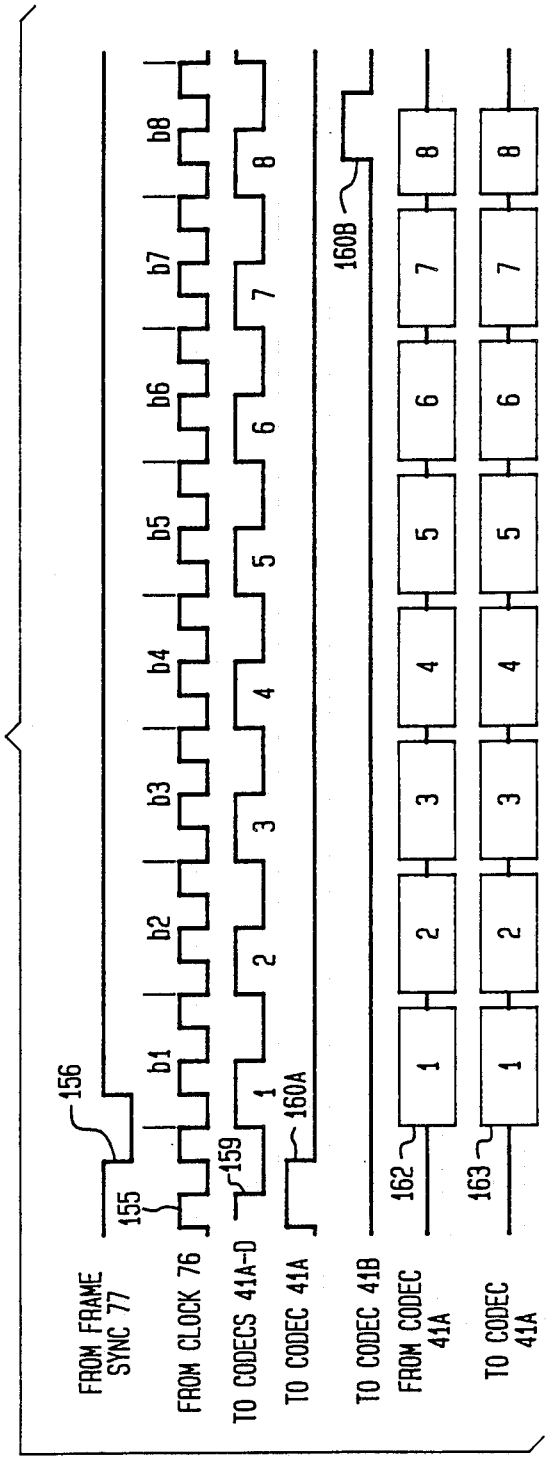
FIG. 5D HIGHWAY BIT CELL TIMING
FIG. 5E CODEC BIT CELL TIMING

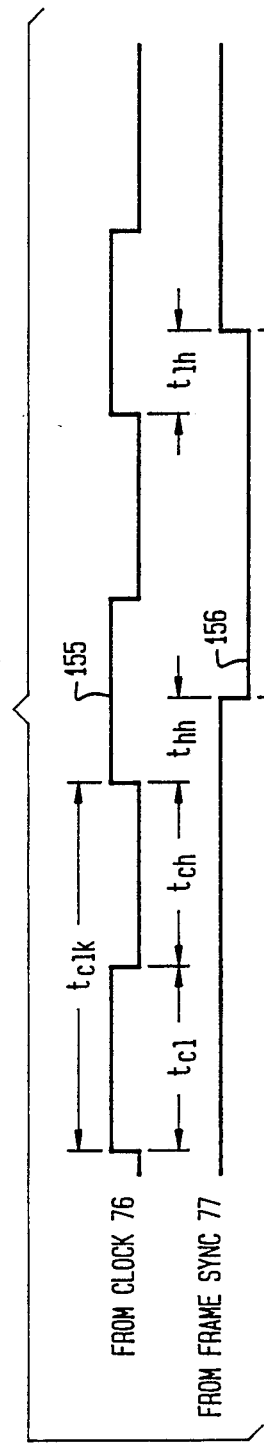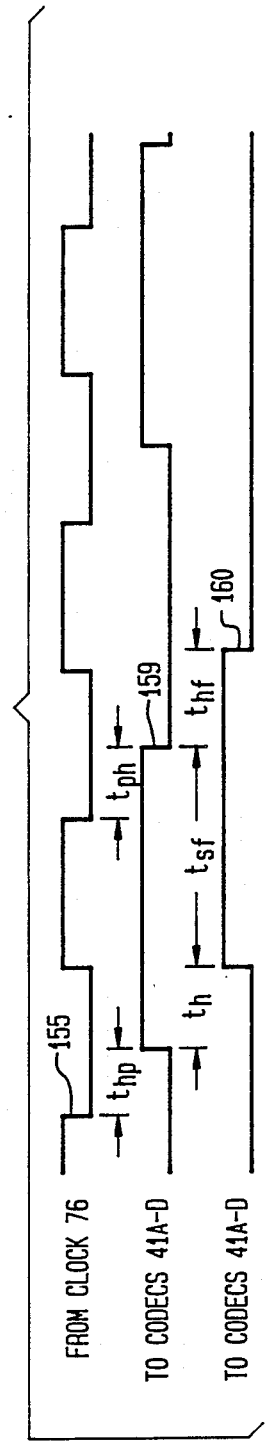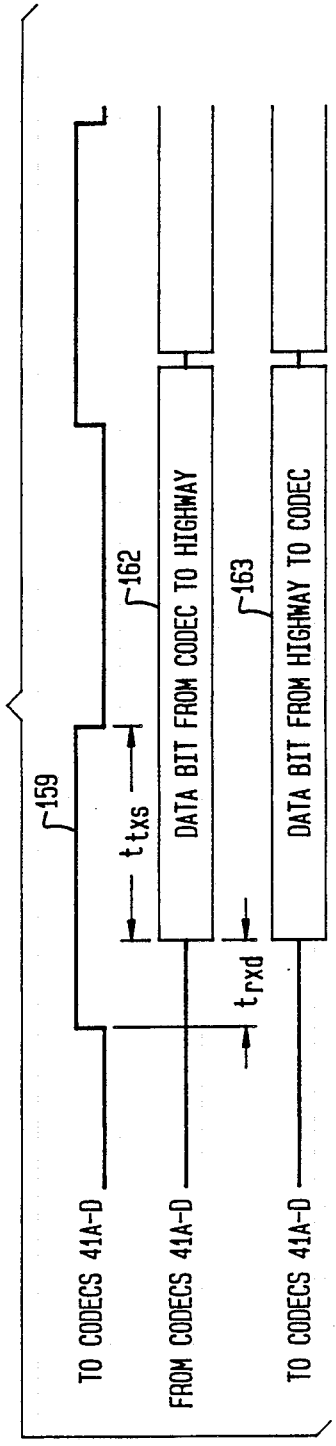

METHOD AND SYSTEM FOR MULTIPLEXING TELEPHONE LINE CIRCUITS TO HIGHWAY LINES

BACKGROUND OF THE INVENTION

A. Field of the Invention

This invention relates to telephone systems and in particular to multiplexing line circuits to a group of transmit and receive highway lines coupled to a central switch.

B. Prior Art

Centrally switched telephone systems are used in business, industry and government. Multiplexers are typically used to connect a large number of phones to a limited number of conventional communication lines. Time division multiplexers provide this capability by periodically allocating a time slot to each of the telephones they will service. In the prior art, multiplexers performed time slot decoding one slot at a time. Each telephone circuit required a separate time slot decoder device to properly phase the data transmissions for the telephone connected to that circuit. This increased the complexity of the multiplexers in two respects. First, more hardware was required to construct the multiplexer. There was a one-to-one correspondence between the number of telephones and the number of time slot decoder devices contained within the multiplexer. Second, the complexity of the software which controlled the telephone system was increased since this central control mechanism had to assign and keep track of time slots for each of the telephones.

SUMMARY OF THE INVENTION

A method and system using at least one multiplexer for multiplexing line circuits to a group of transmit and receive time division multiplex highway lines. The highway lines are coupled to a central switch. The line circuits are clustered into an ordered set of line circuits. Transmission on the highway lines is divided into frames with each frame comprising subframes of time slots and each subframe having a predetermined number of time slots. Each cluster is assigned to an ordered pattern of time slots and transmission periods are provided for each cluster.

Further in accordance with the invention, several multiplexers may be connected to a single set of highway lines. Any of the clusters may be connected to one of the multiplexers which may address any of the highway lines. Highway lines and time slot assignments are readily changed.

BRIEF DESCRIPTION OF THE DRAWINGS

FIG. 1B is a diagram which provides an example of highway lines and time slot assignments.

FIG. 3 is a block diagram showing the six major functions for the multiplexer.

FIG. 4 is a more detailed block diagram showing the functions internal to the multiplexer.

FIG. 5A is a timing diagram showing the timing constraints for the register read operation.

FIG. 5B is a timing diagram showing timing constraints for the register write operation.

FIG. 5C is a timing diagram showing the constraints for highway frame sync timing.

FIG. 5D is a timing diagram showing the constraints for highway bit cell timing.

FIG. 5E is a timing diagram showing the constraints for codec bit cell timing.

FIG. 5F is a timing diagram showing the constraints for the codec clock and frame sync timing.

FIG. 5G is a timing diagram showing the constraints for codec data bit timing.

DETAILED DESCRIPTION OF THE INVENTION

Figure 1A:
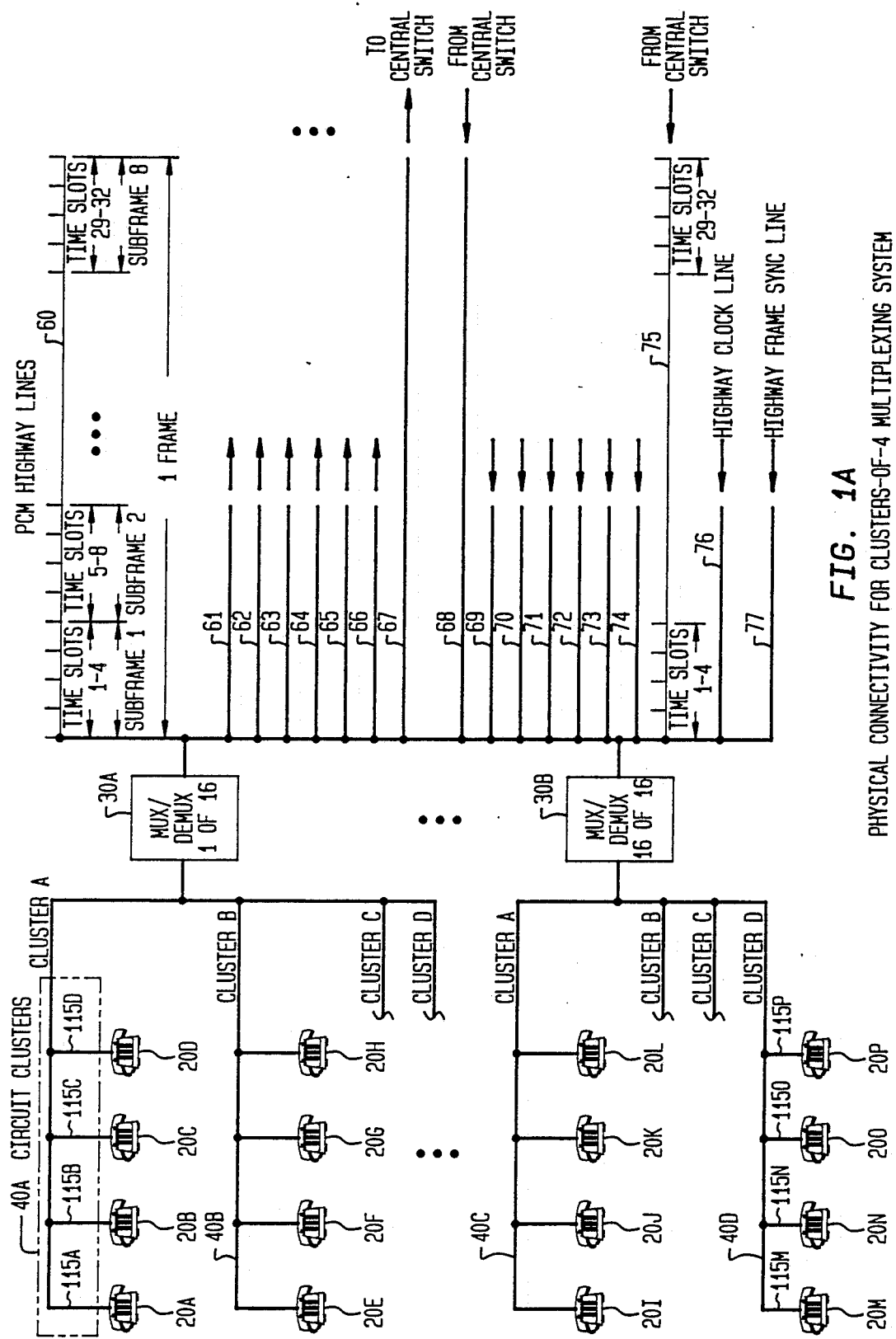
FIG. 1A is a diagram of the connections between a group of line circuits and a multiplexer, as well as the connections between the multiplexer and the highway lines.
Figure 2A:
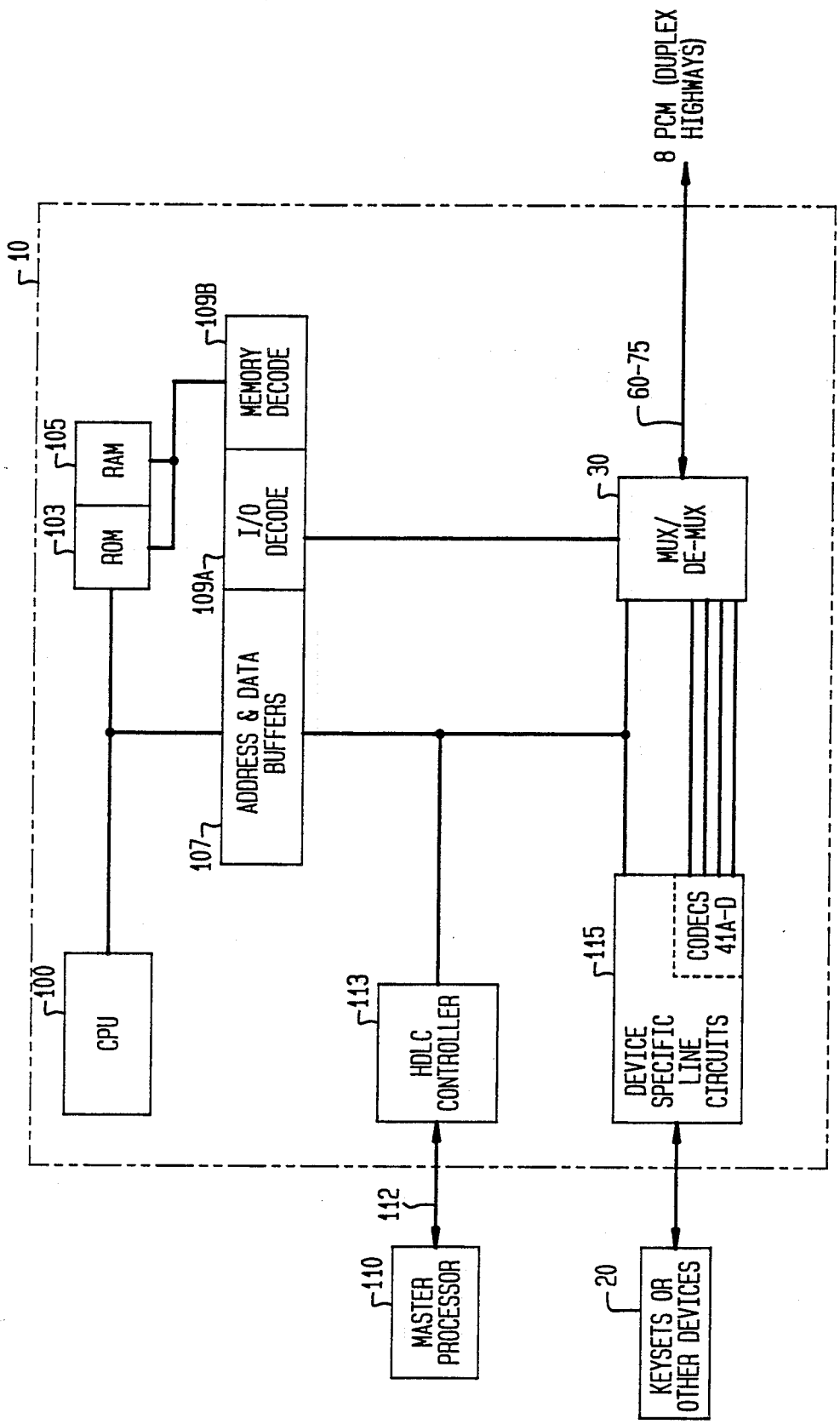
FIG. 2A is a diagram showing the hardware with which the multiplexer must interface.
Figure 2B:
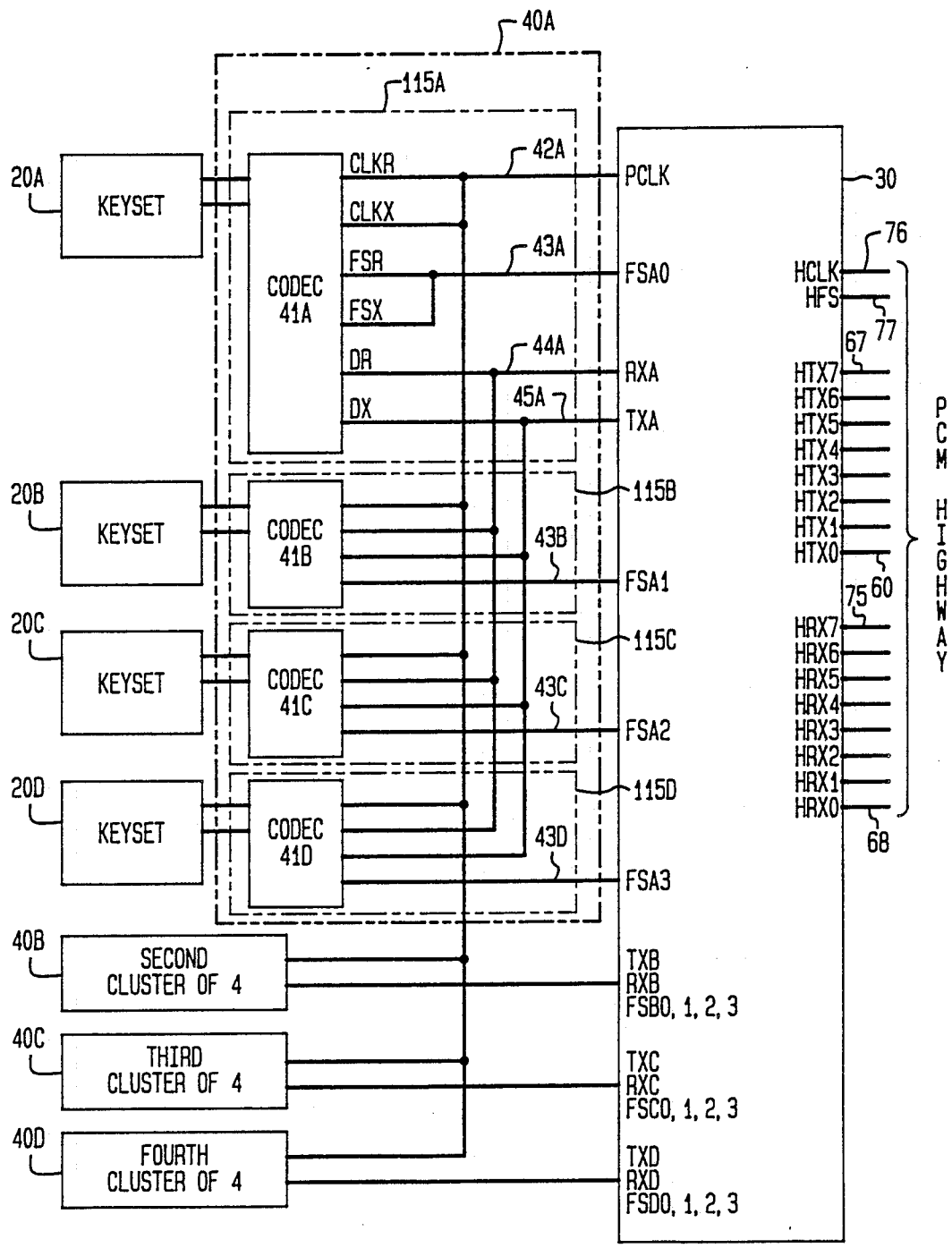
FIG. 2B is a diagram which details the multiplexer-codec and multiplexer-highway connections.

As shown in FIGS. 1A-B, 2B, the basic elements of a digital voice interface according to the invention include a plurality of telephone line circuits 115$a$-$p$, one or more multiplexer/demultiplexers 30$a$-30$p$ (generally referred to as mux/demux 30), and eight highway lines 60-77. The mux/demux provides connectivity among line circuits 115$a$-$p$ and the highway lines.

Line circuits 115$a$-$p$ may support respective I/O devices 20$a$-$p$. Similarly line circuits 115$a$-$p$ may support respective central office (CO) trunks a-p (not shown). Further, I/O devices and CO lines may be mixed so long as they present data in the same format to mux/demux 30. I/O devices 20$a$-$p$ may be analog or digital keysets or single line telephones. If an analog telephone is used, then each telephone must be connected to a respective codec 41$a$-$d$, of line circuits 115$a$-$d$, FIG. 2B, for example, to convert an analog voice signal to a digital data stream. A conventional digital keyset has a built-in codec.

Line circuits 115$a$-$p$ are organized into clusters 40$a$-40$d$. Each cluster 40$a$-40$d$ contains a fixed number of line circuits. A preferred embodiment of the invention includes four line circuits 115$a$-$d$ per cluster. Each line circuit 115$a$-$d$ connects a voice I/O 20$a$-$d$, respectively, to mux/demux 30$a$. Each type of voice I/O device is supported by a different type of line circuit.

As understood by those skilled in the art, all line circuit types including CO lines present data to mux/demux 30 or receive data from mux/demux in the same format. Line circuits 115$a$-115$d$ within a single cluster 40$a$ need not be of the same type (for example, a cluster 40$a$ may support a mixture of digital keysets and single line telephones).

Highways 60-77 are time division multiplexed (TDM), pulse code modulated (PCM) communication lines. Each highway consists of two lines (one transmit 60 and one receive 68). The highways are conventional telephone communication lines. Each highway may carry pulse code modulated digital data at a rate of 2.048 Mhz. There are eight highway receive lines 68-75, which carry digital data from the central switch (not shown) to the mux/demux. There is a clock line 76 which provides a clock signal from the highways to the mux/demux (the 4.096 Mhz clock speed is twice the highway data rate of 2.048 Mhz), and a frame sync line 77 which signals the beginning of the transmission of a unit of data called a frame.

Each mux/demux 30$a$-30$p$ receives data from the line circuits 115$a$-$p$ and channels this data onto one or more highways 60-67. Mux/demux 30$a$-30$b$ also receives data from the highways 68-77 and channels this data to the appropriate line circuits 115a-p and their respective voice I/O devices 20a-20p. Up to sixty-four mux/-demuxes 30a-30p may be attached to a single set of eight highways 60-77. Each mux/demux is capable of receiving data from and sending data to an ordered set of clusters. In the preferred embodiment of the invention, a single mux/demux can interface with as many as four clusters 40a-40d, each cluster 40a-40d supporting four voice I/O devices 20a-20d and four line circuits 115a-115d, for a total of sixteen voice I/O devices 20a-20p per mux-demux. It is understood that the limits of four line circuits per cluster, four clusters per mux/demux, and sixteen line circuits per mux/demux are peculiar to the preferred embodiment of the invention and these numbers are not required to use the invention. The mux/demux 30a provides physical connections to highways 60-75, allowing any of its four clusters 40a-40d to send data to any of the highway transmit lines 60-67 and receive data from any of the highway receive lines 68-75.

Referring now to FIG. 1B, there is shown a telephone network in which the mux/demux 30 provides a logical and efficient organization to a group of sixteen line circuits 115a-p linked to a group of highways 60-63, 68-71. Data is time division multiplexed on each highway 60-75 in frames. Each frame lasts 125 microseconds and contains 32 time slots. During a time slot, a highway can deliver eight digital data bits. Each line circuit 115a and its respective voice I/O device 20a are allocated a single time slot on one of the highway transmit lines 60-63, and on one of the highway receive lines 68-71. A voice I/O device may only send or receive data during its allocated time slot. A highway 60-75 can carry data from/to as many as 32 voice I/O devices during a single 125 microsecond frame. With eight highways 60-75 in each (transmit or receive) direction and 32 time slots per highway, there are 256 time slots. Sixteen of these time slots are reserved for tones, leaving 240 available for line circuits 115a-p.

Each frame is evenly divided into eight subframes, a subframe comprising four consecutive time slots. It is understood that other subframe sizes may be chosen so long as the number of time slots per subframe matches the number of line circuits 115 per cluster. The four time slot subframe was chosen for the preferred implementation, but other sizes would also function (e.g. two, eight or sixteen time slots). Efficient use of the highway requires the frame size to be an even multiple of the subframe size. This eliminates unused time slots in each frame.

Time slot assignments are subject to the constraint that each of the line circuits 115a-d in a single cluster 40a is allocated a time slot within a subframe on one highway 60,68. FIG. 1B shows an example in which circuits 115a-d are organized into Cluster A 40a. Cluster A 40a is allocated the four time slots in the first subframe of highway transmit line 60 and the four receive time slots in the first subframe of highway receive line 68. Similarly, twelve more circuits may be organized into three other clusters of four, Clusters B, C, and D 40b-40d, respectively. Each of these three clusters 40b-40d is allocated to a respective subframe on one of the four highways shown. The invention will allow any combination of cluster 40a and subframe. Every mux/demux 30a-30p has an electrical connection to each of the eight highways 60-75. This total system physical connectivity is combined with the programmable time slot allocations in the mux/demux 30a-30p to make possible a connection between any cluster and any of the 64 subframes on any of the eight highway lines. Other allowable configurations would include: a configuration using the second subframe on each highway 60-75 instead of the first; a configuration which uses any four subframes from a single highway 60,68; or any other combination which uses four subframes from two, three, or four highways 60-77.

Heretofore, multiplexers performed time slot decoding one slot at a time. A group of sixteen telephone circuits required sixteen time slot decoder chips to properly phase the data transmissions of the telephones. Under the present invention, line circuits 115a-d are grouped into clusters of four 40a, reducing the number of time slot decoders fourfold. This reduces the amount of hardware logic necessary to support a group of line circuits, thereby lowering costs, and provides a logical organization to the time slot assignments as well. The organization of time slots simplifies the software which allocates the highway and time slots.

Another characteristic of prior central switched telephone systems was the use of fixed time slot and highway assignments for each circuit supported. In the present invention, each mux/demux 30 provides connections to all eight highways 60-77. The mux/demux 30 is programmable, allowing all of the highway and time slot allocations to be changed without regard to the previous configuration. For example, in the event of a failure of a mux/demux, the time slots previously allocated to the defective mux/demux could be reallocated to a new mux/demux. Another example may include the reallocation of all highway and time slot assignments following the addition of a new mux/demux 30 and its associated line circuits 115a-d. Because each mux/demux 30 is electrically connected to all of the highways 60-75, this reallocation of highway and time slot assignments does not require any physical change to the network. The reconfiguration may be performed by issuing software instructions to the mux/demux 30. The only limitation on the configuration is that each cluster 40a-40d must be allocated to a single subframe. Because the line circuits 115a-p attached to a single mux/demux 30 are organized into a maximum of four clusters 40a-40d, and each cluster is allocated to a single highway subframe, a single mux/demux 30 can only support communications among line circuits 115a-p and a maximum of four highways 60-77 at any one time.

FIG. 2A shows how mux/demux 30 and the circuitry associated with it are organized to provide an orderly and flexible system. A single master processor 110 controls the network configuration (highway 60-75 and time slot allocations for each cluster 40) by issuing commands to the microprocessor 100 located on each peripheral processor. Peripheral processor 10 includes mux/demux 30 and microprocessor 100 which provides instructions to mux/demux 30. Microprocessor 100 communicates with master processor 110 using a conventional serial communications protocol called high level data link control (HDLC). When master processor 110 commands microprocessor 100 to allocate or deallocate a voice I/O cluster 40, the microprocessor loads the control registers of mux/demux 30 to establish a cluster 40, highway 60,68 and time slot combination. Once the instructions are written in mux/demux 30 control registers, decode logic inside mux/demux 30 determines which of the sixteen voice I/O devices 20 will or receive data to or from the highways 60-75 at any given time. Peripheral processor 10 also contains up to 16 line circuits 115 organized into clusters 40 of four. The type of line circuit 115 will depend on the type of voice I/O device to which the mux/demux 30 will interface. All line circuit types present data to mux/demux 30 in the same format, allowing mux/demux to accept data from any combination of voice I/O device types.

The network is established by linking the master processor 110 and the highways 60-77 with one or more peripheral processors 10 and their associated voice I/O devices 20. Microprocessor 100 on each peripheral processor 10 sends messages to master processor 110 so that master processor 110 can determine the number and types of line circuits 115a-d interfacing with the network. Master processor 110 then sends messages to microprocessors 100 defining the highway 60-75 and time slot assignments for each line circuit 115 and its respective voice I/O device 20. To add, subtract, or change the voice I/O devices 20 which are included in the network, the user is only required to add, subtract, or replace peripheral processors 10. Master processor 110 detects that a peripheral processor 10 has been added/subtracted, and it will automatically assign new time slots to any new clusters 40 and deallocate any time slots assigned to removed clusters 40. It is thus possible to add line circuits 115 to an existing network by adding a single peripheral processor 10.

Referring to FIG. 2B, there are emphasized mux/demux 30 connections to both the line circuits 115a-d and PCM highways 60-75. The right side of FIG. 2B shows the highway interfaces. Connections HTX0 through HTX7 are the transmit connections to the highway lines 60-67. Connections HRX0 through HRX7 are the receive connections from the highway lines 68—75. Connection HFS receives data from the highway frame sync 77. The central switch sends a signal to mux/demux 30 through HFS each time a new data frame begins transmission over the highway. The HCLK connection provides mux/demux 30 with a highway clock signal from line 76. This clock signal allows synchronous operation of the highway and the mux/demux chip.

The left side of FIG. 2B shows the connections between mux/demux 30 and four clusters 40a-40d. For purposes of illustration, a detailed view is only provided for cluster 40a. The configurations for clusters 40b-40d are similar to the configuration of cluster 40a. Focusing on cluster 40a there are shown interfaces to four line circuits 115a-d and their respective voice I/O devices 20a-20d. In FIG. 2B the voice I/O devices are analog devices. In order to interface with the mux/demux 30, each voice I/O device 20a-20d is provided with a conventional codec device 41. Codec devices 41 convert the analog data stream from the voice I/O device into a digital data stream. The codecs 41 may sample data at a rate of 8000 times per second. As shown in FIG. 2B there is a single transmit TXA connection 45a and a single receive RXA connection 44a for each cluster. The voice I/O devices 20a-20d in a single cluster will share the single transmit TXA line 45a and receive RXA line 44a. To assure that each voice I/O device 20a-20d only transmits or receives during its alloted time slot, each line circuit 115a-d is provided with its own frame sync connection FSA0-FSA3 43a-d. Mux/demux 30 provides a frame sync signal to each of the line circuits 115a-d signalling each at the beginning of its assigned time slot. There is also a PCLK clock connection 42a between mux/demux 30 and each of the clusters 40a-40d. This PCLK connection 42a provides the clock signal to the clusters. Mux/demux 30 generates the PCLK signal at one-half the frequency of the signal that mux/demux receives from the highway clock line 76.

In FIG. 3 there is shown a functional diagram of a mux/demux 30. There are six major functions for mux/demux, which are shown as blocks in FIG. 3. The first function is the 256 channel highway interface 120. The highway interface includes the 16 transmit and receive highway lines plus the clock line and the frame sync line for the highway. All data sent to or from the highways 60-75 must pass through the highway interface. In addition, mux/demux 30 receives its clock signal and frame sync signal from highway interface 120. The clock signal may be a 4.096 megahertz clock. Both the beginning and the ending of each digital data bit will lie on the falling edges of the clock signal. The highway frame sync is used to synchronize the operation of the mux/demux 30 with the central switch. Following the receipt of the signal from the frame sync, a counter inside mux/demux will be reset on the next negative transition of the clock signal (i.e., when the clock signal goes from a high value to a low value).

There are four cluster selectors 122a-122d, each providing control and a data interface for a cluster of four line circuits 115a-d. Each cluster selector 122a-122d will activate its four codecs 41, one at a time, in sequence. When activated, codec 41 sends data to its associated voice I/O device 20, or to mux/demux 30, as required.

Lastly there is a microprocessor control interface 129 which allows mux/demux 30 to communicate with microprocessor 100. It is through this interface that microprocessor 100 sends the highway and time slot allocations for each cluster 40a-40d. This interface provides a means to read from or write to the register 131 for each of the clusters 40a-40d. The registers can store highway and time slot identifiers, and indicators which define whether the cluster will be enabled or disabled during the particular time slots. The microprocessor interface also provides a means to reset mux/demux 30. When the mux/demux 30 is reset, it will send signals to master processor 110, defining the number of clusters it supports. Master processor 110 will then assign a new set of cluster highway and time slot allocations, which may be the same as or different from those assignments which were in effect prior to the reset.

FIG. 4 shows the functions which are performed by the hardware logic within mux/demux 30. Microprocessor interface 129 comprises a register select logic 130 and four cluster read and write registers 131a-131d. Registers 131a-131d store the highway and time slot allocations for clusters 40a through 40d respectively. These highway and time slot allocations are written to registers 131a-131d by microprocessor 100 which in turn has received the highway and time slot allocations from master processor 110. A read yields the last written value. When microprocessor 100 reads from or writes to one of the registers 131a-131d, register select logic 130 decodes the register address provided by microprocessor 100 so that the proper cluster read or write register 131a-131d will be chosen. In addition to the register address, microprocessor 100 also provides mux/demux 30 with a control signal. This control signal enables or disables the cluster which is indicated by register select logic 130. This control signal is also stored in the cluster read/write register 131. Microprocessor interface 129 thus provides the capability to reprogram the highway and time slot allocations for each cluster whenever it is necessary to do so.

Highway interface 120 allows for synchronization between highway lines 60-75 and clusters 40a-40d. Synchronization must be provided at the time slot level, the subframe level and at the frame level. Mux/demux 30 receives two signals from highway interface 120 which are used for synchronization. The first of these signals is the highway clock (HCLK). The second is the highway frame sync (HFS). HCLK and HFS should be the same clock and frame sync signals that drive the central highway switch. The PCLK generator 132 inside the highway interface 120 receives the HCLK signal from highway 76. The function of PCLK generator 132 is to provide a synchronized clock signal to each of the codec clusters 40a-40d. PCLK generator 132 receives HCLK, which is a buffered version of the 4.024 Mhz square wave that drives the central switch. PCLK generator 132 outputs to the codecs PCLK signal which transitions from high to low or low to high once for each complete cycle of the HCLK signal. In other words, the PCLK signal frequency is one-half of the HCLK signal frequency. Highway state machine 133 receives the highway frame sync (HFS) signal from highway 77 each time that highways 68-75 send a frame of data. Highway state machine 133 will send a signal to both time slot counter 134 and frame sync generator 135 signalling the beginning of new frame of data. Following receipt of the frame sync signal, time slot counter 134 begins counting off units of time each equal to a time slot. Each time another time slot is completed, time slot counter 134 passes a signal to both frame sync generator 135 and the cluster codec frame sync selector 138. The signal which is sent to the cluster codec frame sync selectors 138 acts as a frame sync for individual codecs 41. The signal which is sent to frame sync generator 135 allows it to count off subframes. Each time that generator 135 counts off four time slots, it signals the appropriate codec cluster 40 to begin transmission or receipt of data to or from the highway. With frame sync generator 135 providing cluster activation signals, time slot counter 134 providing the signal for the activation of individual codecs 41, and all codecs 41 synchronized to the PCLK signal, all the proper timing relationships are maintained.

The third type of interface for the mux/demux 30 is the cluster highway selector codec controller interface 122a. For simplicity, only one is shown in detail for cluster A; of the four 122a-d shown in FIG. 3. All are similar. As noted before, frame sync generator 135 sends a signal to the appropriate cluster codec frame sync selector 138 at the beginning of that cluster's subframe. Following receipt of the signal from generator 135, a different codec 41 will be activated each time counter 134 signals the beginning of a new time slot. When selector 138 sends a signal to enable a particular codec 41 and its associated voice I/O device 20, codec 41 begins receipt or transmission of data at the next signal transition for that cluster's PCLK signal. Using a feature of conventional codec devices, codec 41 begins to transmit or receive data and continue for the duration of a single time slot, after which it will automatically stop without further signals from any external source. Selector 138 has additional control interfaces with cluster receive highway selector 136 and cluster transmit highway time slot enable controller 137. Selector 136 fetches from the cluster read registers 131a-131d the highway and time slot assignments for each cluster. It will also retrieve from each register a control signal which tells it whether the cluster is to be enabled or disabled. When selector 136 receives control signals from the selector 138, it will receive data from the appropriate highway during the appropriate time slots and pass this data on to the codecs 41 and the voice I/O devices 20. There is a single data stream which is sent from selector 136 to the codecs 41 in parallel. Only one of these codecs 41 will actually decode the data and pass it on to its voice I/O device 20, because the selector 138 will only enable a single codec 41 and voice I/O device 20 at any one time. Similarly, cluster transmit highway time slot and enable controller 137 can retrieve the highway and time slot assignment from registers 131 and the enable status telling it whether the cluster 40 is enabled or disabled. As selector 138 enables the cluster codecs 41-41c one at a time, controller 137 receives the data from the activated codec 41 and transmits it to the appropriate highway during the appropriate time slot.

FIGS. 5A through 5G show the critical timing relationships for mux/demux 30 operation. In addition, the timing constraints are tabulated in Tables 1A-1E. FIG. 5A shows the required timing relationships for microprocessor 100, FIG. 2A, to read the contents of the read/write registers 131a-d of interface 129, FIG. 4, within mux/demux 30. Throughout the read operation, microprocessor 100 provides mux/demux 30 with the I/O port address 150 of one of registers 131a-d which it intends to read. The read operation is begun when the chip select signal 151 is entered, coinciding with or followed by the read signal 152. Read signal 152 has a minimum duration of 100 nanoseconds ($t_{rd}$). Within 50 nanoseconds ($tr_{dd}$) after initiating the read by read signal 152, the highway and time slot assignment data (read data) 153 which is stored in one of the registers 131a-d will become available for microprocessor 100 to read. To insure the integrity of the read process, read data 153 is held available at least 15 nanoseconds ($t_{rdh}$) after the read operation, and chip select signal 151 is maintained at least 15 nanoseconds ($t_{rdcs}$) beyond the end of read signal 152. The timing constraints for the read operation are summarized in Table 1A.

FIG. 5B shows the timing constraints for write timing in interface 129 which are similar to the contraints for read timing. Throughout the duration of the write operation, microprocessor 100 provides microprocessor interface 129 of mux/demux 30 with the I/O port address 150 of the register 131 to which it intends to write. The chip select signal 151 must also be operative throughout the operation. The write signal 154 must coincide with or follow the chip select signal 151. The data to be written into register 131 must coincide with or precede write signal 154. Write signal 154, telling the register to record the data, must last at least 100 nanoseconds $t_{wr}$). Following completion of write signal 154, to insure the integrity of the write operation, the I/O port address 150 which will be written and the chip select signal 151 should be maintained for at least 15 nanoseconds ($t_{wrh}$ and $t_{wrcs}$). The timing constraints for the write operation are summarized in Table 1B.

FIG. 5C shows the timing relationships for the highway frame sync. The highway clock (HCLK) 155 and the highway frame sync 156 should be the same clock and sync signals that drive the central highway switch. The highway clock 155 period ($t_{clk}$) is constrained in the preferred embodiment to a typical duration of 244 nanoseconds, with values between 220 and 300 nanoseconds acceptable. The clock period should be equally divided so that HCLK 155 assumes its high value one half of the time and its low value one half of the time. The transition time ($t_{ctt}$) between high and low HCLK 155 values is about 20 nanoseconds. Following the beginning of the appropriate clock period, when it is time for a new highway frame to begin transmission, no more than 60 nanoseconds ($t_{hh}$) should pass before the actual transition of the frame sync signal 156 from its high value to its low value. Frame sync 156 should last approximately one period of HCLK 155, i.e., 244 nanoseconds ($t_{fp}$). Frame sync 156 signal should end within 60 nanoseconds ($t_{lh}$) of completion of the HCLK 155 period. The timing constraints for the highway frame sync are summarized in Table 1C.

FIG. 5D shows the highway data bit timing relationships. This includes the relationship of the highway clock HCLK 155, the frame sync signal HFS 156 and the data bits. The transmit data signal HTX 157 and the receive data signal HRX 158 coincide with one another. The duration of a single data bit corresponds to two complete cycles of HCLK 155. The beginning of a data bit will coincide with the negative transition of every other HCLK signal 155, i.e., when the HCLK signal goes from its high value to its low value. The first bit of a new data frame begins at the first negative transition of HCLK 155 after a negative transition of HFS 156.

FIG. 5E shows the general relationships of the highway clock HCLK 155 and the highway frame sync HFS 156 signals to the mux/demux PCLK 159 output signal and the mux/demux frame sync outputs, FSA0 160a and FSA1 160b. The PCLK signal 159 is the clock signal which mux/demux 30 outputs to its voice I/O devices 20. The period of PCLK 159 is twice the period of HCLK 155. PCLK 159 transitions from high value to low value or low value to high value coincide with negative HCLK 155 transitions, i.e., when HCLK 155 changes from high value to low value. Note that the duration of time depicted in FIG. 5E is approximately the length of one time slot. During this time only one of the voice I/O devices 20 attached to one of the codec clusters 40 will be transmitting data TXA 162 or receiving data RXA 163. Following the beginning of the HFS signal 156, the line circuits 115 and their respective voice I/O devices 20 will begin to transmit data to highways 60-67 and receive data from highways 68-75 through mux/demux 30, beginning at the first negative transition of the HCLK 155 after the beginning of the HFS signal 156. This is the beginning of a new frame. Each data bit received from codec 41 lasts for one complete period of PCLK signal 159. The transmission of a bit from a codec (TXA 162) or to a codec (RXA 163) begins when PCLK 159 transitions from low to high. The data transmission from the voice I/O devices 20 to the highways 60-75 begins after the codec frame sync FSAO 160a is received by the codec 41 associated with the voice I/O device. A separate codec frame sync 160a-160d is sent to each of the codecs 41 in cluster 40.

FIG. 5F shows in greater detail the relationship between highway clock HCLK 155 and the PCLK signal 159 generated by the PCLK generator 132 within mux/demux 30. The frame sync signal 160a-160d sent to the codecs 41 by the cluster codec frame sync selector 138 is also shown. As noted above, the period of the PCLK signal 159 is twice as long as the period of the HCLK 155. Transition of the PCLK signal 159 must follow the transition of the HCLK signal 155 by no more than 30 nanoseconds ($t_{hp}$). When mux/demux 30 sends a frame sync signal 160 to one of the codecs 41, the frame sync signal 160 must coincide with or follow the positive transition of the PCLK signal 159. Frame sync signal 160 must begin at least 50 nanoseconds ($t_{sf}$) before the next negative transition of the PCLK signal 159. Finally, the frame sync signal 160 must end no more than 100 nanoseconds ($t_{hf}$) after the next negative transition of the PCLK signal 159. The timing constraints for PCLK and codec frame sync signals are summarized in Table 1D.

FIG. 5G shows the relationship between the mux/demux 30 generated PCLK signal 159 and the data transmissions from and to the voice I/O devices 20 through the codecs 41. A data bit lasts for the length of one PCLK cycle. The beginning of the data bit may coincide or follow the positive transition of the PCLK signal 159. The beginning of the data bit transmission can be no more than 100 nanoseconds ($t_{txs}$) prior to the negative transition of the PCLK signal 159. Data bits transmitted from voice I/O device 20 to mux/demux 30 and from mux/demux to voice I/O device begin at approximately the same time. The constraints for codec data bit timing are summarized in table 1E.

COMPONENTS

Tables 2A-C list components required to produce each of the major functions which comprise mux/demux 30. As noted in table 2-C, all of the cluster highway selector/codec controllers 122a-d are similar. The same parts may be used for each of the four controllers.

GLOSSARY

CLUSTER

A cluster is a group of line circuits and associated electronics which convert the analog voice data into a stream of digital data bits which may be processed by a mux/demux.

FRAME

A frame consists of a unit of digital data which in one example is transmitted during a 125 microsecond period. During such a frame, 256 bits of data are sent. Each of the voice I/O devices assigned to time slots on a particular highway will be able to send 8 bits of data during a single frame.

LINE CLUSTERS

Each voice I/O device has an associated line circuit which contains the hardware necessary to provide an interface between the voice I/O device and the mux/demux. The line circuit may include a codec to convert an analog voice signal to a digital data stream or to convert a digital data stream back to an analog voice signal. The line circuit may also include hardware needed to produce tones and light signals in the voice I/O device.

MASTER PROCESSOR:

The master processor is a single processor which makes highway and time slot allocations for all clusters within the network.

PERIPHERAL PROCESSOR

A peripheral processor contains single mux/demux 30, the line circuits needed to interface with voice I/O devices, codecs (if analog keysets or telephones are used) and a processor and memory for controlling the mux/demux.

SUBFRAME

A subframe is a unit of data comprising, for example, four time slots. During such a single time slot, eight bits of data are sent on a highway. Time slots are not allocated to voice I/O devices on an individual basis, but instead a cluster of four I/O devices will be allocated to a single subframe.

TABLE 1A

Read Timing Specification

| Symbol | Item | Min | Typ | Max | Unit |
|---|---|---|---|---|---|
| $t_{acs}$ | address valid to chip select active setup | 0 | — | — | ns |
| $t_{csa}$ | chip select inactive to add inactive hold | 0 | — | — | ns |
| $t_{csrd}$ | chip select active to read active setup | 0 | — | — | ns |
| $t_{rd}$ | read width | 100 | — | — | ns |
| $t_{rdcs}$ | read inactive to chip select inactive | 15 | — | — | ns |
| $t_{rdd}$ | read active to data available delay | — | — | 50 | ns |
| $t_{rdh}$ | read data hold time | 15 | — | — | ns |

TABLE 1B

Write Timing Specification

| Symbol | Item | Min | Typ | Max | Unit |
|---|---|---|---|---|---|
| $t_{acs}$ | address valid to chip select active setup | 0 | — | — | ns |
| $t_{csa}$ | chip select inactive to add inactive hold | 0 | — | — | ns |
| $t_{cswr}$ | chip select active to write active delay | 0 | — | — | ns |
| $t_{wr}$ | write width | 100 | — | — | ns |
| $t_{wrcs}$ | write inactive to chip select inactive | 15 | — | — | ns |
| $t_{wds}$ | write data setup time | 0 | — | — | ns |
| $t_{wrh}$ | write data hold time | 15 | — | — | ns |

TABLE 1C

Highway Frame Sync Timing Specification

| Symbol | Item | Min | Typ | Max | Unit |
|---|---|---|---|---|---|
| $t_{clk}$ | clock period | 220 | 244 | 300 | ns |
| $t_{cl}$ | clock width low | 110 | 122 | 150 | ns |
| $t_{ch}$ | clock width high | 110 | 122 | 150 | ns |
| $t_{ctt}$ | clock transition time | — | 20 | — | ns |
| $t_{hh}$ | frame high hold | — | — | 60 | ns |
| $t_{lh}$ | frame low hold | — | — | 60 | ns |
| $t_{fp}$ | frame pulse width | — | 244 | — | ns |

TABLE 1D

PCLK and Codec Frame Sync Timing Specification

| Symbol | Item | Min | Typ | Max | Unit |
|---|---|---|---|---|---|
| $t_{hp}$ | HCLK low to PCLK high delay | — | — | 30 | ns |
| $t_{ph}$ | HCLK low to PCLK low delay | — | — | 30 | ns |
| $t_h$ | holding time from PCLK high to FS | 0 | — | — | ns |
| $t_{sf}$ | setup time from FSX to PCLK low | 50 | — | — | ns |
| $t_{hf}$ | hold time from PCLK low to FSX low | — | — | 100 | ns |

TABLE 1E

Codec Data Bit Timing Specification

| Symbol | Item | Min | Typ | Max | Unit |
|---|---|---|---|---|---|
| $t_{txs}$ | TX data from codec valid to PCLK low setup | — | — | 100 | ns |
| $t_{rxd}$ | PCLK high to RX data valid delay | 0 | — | — | ns |

TABLE 2A

Microprocessor Interface 129

| Function | Reference Character | Quantity | Chip | Comments |
|---|---|---|---|---|
| Register Select Logic | 130 | 2 | 74138 | 1 of 8 decoders |
| Cluster A, B, C and D Read registers | 131a-d | 4 | 74541 | Octal Buffers |
| Cluster A, B, C and D Write registers | 131a-d | 4 | 74174 | Hex D Flip Flop |
|  |  | 2 | 7474 | Dual D Flip Flop |

TABLE 2B

Highway Interface 120

| Function | Reference Character | Quantity | Chip | Comments |
|---|---|---|---|---|
| PCLK Generator | 132 | 1 | 74112 | Dual JK Flip Flop |
| Highway State Machine | 133 | 1 | 16R4 | PAL |
| Time Slot Counter | 134 | 1 | 7404 | Hex Inverter |
|  |  | 1 | 7421 | Dual 4-in and Gate |
|  |  | 3 | 7474 | Dual D Flip Flop |
| Frame Sync Generator | 135 | 1 | 7404 | Hex Inverter |
|  |  | 1 | 7421 | Dual 4-in and Gate |
|  |  | 4 | 74138 | 1 of 8 Decoders |

TABLE 2C

Cluster A Highway Selector/Codec Controller 122a/122b/122c/122d

| Function | Reference Character | Quantity | Chip | Comments |
|---|---|---|---|---|
| Cluster Frame Sync Selector | 138 | 1 | 7404 | Hex Inverter |
|  |  | 4 | 74151 | 8-input Multiplexers |
| Cluster Receive Highway Selector | 136 | 4 | 74151 | 8-input Multiplexers |
| Cluster Transmit Highway Time Slot Enable Controller | 137 | 1 | 7486 | Quad 2-in Exclusive-OR Gate |
|  |  | 1 | 7427 | Triple 3-in NOR Gate |
|  |  | 1 | 74138 | 1 of 8 Decoder |
|  |  | 2 | 74125 | Quad Buffers, with 3-State Outputs |

What is claimed is:

1. A method using at least one multiplexer for multiplexing line circuits to a group of highways coupled to a central switch, each highway transmitting data to and from said central switch, each multiplexer including memory elements, said method, comprising the steps of:

(a) clustering the line circuits into an ordered set of circuit clusters, each circuit cluster comprising a fixed number of line circuits;

(d) dividing transmission on each highway into frames of fixed duration, each frame comprising subframes;

(c) dividing each subframe into a number of time slots equal to the number of line circuits in one of said circuit clusters;

(d) selecting one of said highways to transmit data between each circuit cluster and the central switch and identifying the selected highway by placing a highway selection value in a memory element within the multiplexer;

(e) providing each circuit cluster an electrical path to its respective highway in response to the highway selection value;

(f) selecting respective subframes of time slots to transmit data between said circuit clusters and the central switch, and identifying each selected subframe by placing a subframe selection value in a further memory element within the multiplexer; and (g) providing respective transmission periods to each cluster during its selected subframe, in response to the subframe selection value.

2. The method of claim 1 in which there are provided the further steps of:
reassigning the highways to the circuit clusters by replacing the highway selection values in the memory elements within the multiplexer;
reassigning the subframes to the circuit clusters by replacing the subframe selection values in the memory elements within the multiplexer.

3. The method of claim 1 in which the method includes the further steps of:
using at least two multiplexers;
providing electrically conductive paths for each highway, connecting it to every used multiplexer;
providing a further electrically conductive path for each circuit cluster, connecting it to only one of the used multiplexers;

4. The method of claim 1 in which step (b) further comprises the step of:
receiving, at the multiplexer, a frame sync signal from the central switch, the frame sync signal defining the beginning of each frame.

5. The method of claim 1 in which step (f) further comprises the steps of:
assigning each line circuit within the cluster to one of said highways, using the multiplexer;
assigning each line circuit within the cluster to a respective subframe defined for the assigned highway using the multiplexer; and
assigning consecutive subframes to the line circuits within the cluster using the multiplexer.

6. Apparatus for transferring voice digital data in a system including a plurality of line circuits grouped in clusters and coupled to at least one multiplexer, said multiplexer coupled to a plurality of highways, said highways coupled to a central switch, each multiplexer including memory elements, the apparatus comprising:
synchronization means for synchronizing data transmissions between line circuit and multiplexer with data transmissions between multiplexer and highways;
time slot counting means for signalling the passage of a time slot interval;
subframe counting means, responsive to signals from the time slot counting means, for signalling the passage of a specified number of time slot intervals constituting a subframe;
cluster selection means, responsive to signals from the subframe counting means, for providing a cluster activation signal sequentially to each cluster, signalling the beginning of a subframe;
codec means, responsive to the time slot counting means and cluster selection means, for sequentially transmitting data between the multiplexer and each line circuit within a cluster in response to a cluster activation signal; and
control means for specifying the highway and subframe addressed by each circuit cluster.

7. The apparatus of claim 6 wherein the system includes at least two multiplexers, the apparatus further including:
respective electrically conductive paths for each highway, connecting each highway to every multiplexer; and
a further electrically conductive path for each circuit cluster, connecting each circuit cluster to a respective one of the multiplexers.

* * * * *